United States Patent Office 3,682,800
Patented Aug. 8, 1972

3,682,800
METHOD FOR PRODUCING ACRYLONITRILE COPOLYMERS
Hajime Miyama, Fujisawa, Noriho Harumiya, Kamakura, Mituru Nakao and Mutsumi Kimura, Otsu, Isao Ito, Matsuyama, and Katunori Ohgushi, Iyo-gun, Japan, assignors to Toray Industries, Inc., Tokyo, Japan
No Drawing. Filed July 9, 1970, Ser. No. 53,670
Claims priority, application Japan, July 25, 1969, 44/58,376
Int. Cl. C08f 1/20
U.S. Cl. 204—159.23                                    2 Claims

ABSTRACT OF THE DISCLOSURE

Photocopolymerization of acrylonitrile and vinylidene chloride, comprising projecting light onto these reactants in an organic solvent in the presence of hydrogen peroxide.

BACKGROUND OF THE INVENTION

The copolymer of acrylonitrile and vinylidene chloride is known as non-flammable polymer to those skilled in the art, and it is an important material used in many fields. It is normally produced by thermal polymerization. Special apparatus is required for refluxing vinylidene chloride, or for carrying out the reaction under high pressure to prevent its evaporation because the boiling point of vinylidene chloride is low. Accordingly, the selection of operating conditions becomes very difficult.

In addition, the physical properties (such as whiteness and strength) of fibers made of the copolymer produced through thermal polymerization are subject to improvement.

Accordingly, efforts have been made to establish an improved method for producing a copolymer of acrylonitrile and vinylidene chloride which overcomes these disadvantages, and as a result the physical properties of the obtained copolymer are excellent.

SUMMARY OF THE INVENTION

The present invention is a method for producing acrylonitrile-vinylidene chloride copolymers having excellent whiteness and strength, comprising projecting light onto acrylonitrile and vinylidene chloride in an organic solvent in the presence of hydrogen peroxide.

DESCRIPTION OF THE PREFERRED EMBODIMENT

In the present invention, the ratio of acrylonitrile and vinylidene chloride to be copolymerized, can be selected in accordance with the field of the use of the copolymer. For example, when the percentage of vinylidene chloride is greater, the flame resistance is relatively excellent, and when the percentage of vinylidene chloride is less, the physical properties of the fiber are excellent.

Preferably, the molar ratio of acrylonitrile to vinylidene chloride is from about 17:3 to about 13:7.

In regard to the polymerization temperature, there is no special restriction, but it is preferable that the polymerization be carried out at a temperature in the range from about 10° C. to about 60° C.

With respect to the polymerization solvent to be used in the method of the present invention, such organic solvents as dimethylformamide, dimethylacetamide, dimethylsulfoxide, ethylene carbonate and γ-butyrolactone can be used, but preferably, those organic solvents having high polymer solubility and little chain transfer, such as dimethylsulfoxide, ethylene carbonate and dimethylformamide, can be used with special advantage.

In regard to the concentration of monomer, it is not preferred to raise the concentration too high in the polymerization step, in view of the ease of the removal of heat of polymerization and the ease of stirring, and it is appropriate to employ a concentration ranging from about 1 mol/litre to about 8 mols/litre based on the amount of reaction mixture.

As the hydrogen peroxide to be used in the present invention, an aqueous solution containing decomposition inhibitor such as sodium pyrophosphate can be used, or distilled hydrogen peroxide can also be used.

The range of the concentration of hydrogen peroxide is preferably from about 0.002 to about 0.8 mol/litre of the reaction mixture.

It is preferable to use from about 300 to about 400 m$\mu$ of ultraviolet rays, preferably from about 320 to about 400 m$\mu$ of ultraviolet rays, as the light to be projected.

As the light source, any light source which can effectively produce light of short wave length in the neighborhood from about 300 to about 400 m$\mu$ can be used, but it is preferable to use a high pressure mercury arc lamp which is capable of producing a strong bright line spectrum at 365 m$\mu$.

In the photocopolymerization of acrylonitrile and vinylidene chloride, it is possible to use methylacrylate, methyl methacrylate, vinylacetate, sodium allylsulfonate, sodium styrene sulfonate, potassium styrene sulfonate, and other copolymerizable components.

The above given conditions such as temperature, concentration, and intensity of light source can be appropriately changed along with the progress of polymerization.

Reactors of the internal irradiation type, or of the external irradiation type can be used, but because of its effective utilization of light, a reactor of internal irradiation type is preferable.

In carrying out the polymerization of the present invention, it is possible to add a chain transfer agent or an anti-coloration agent, and like additives, if necessary in addition to acrylonitrile and the copolymerized monomer.

In particular, in accordance with the present invention, when from about $10^{-5}$ to about 1 mol/litre of phenol substituent, particularly salicylic acid and derivatives thereof based on the amount of the reaction mixture is added as an agent preventing discoloration, it is possible to further improve the whiteness of the product.

Salicylic acid and derivatives thereof to be used in the method of the present invention include salicylic acid, alkyl salicylic acid, salicylanilide, salicylamide, cresotinic acid, alkylene bis salicylic acid, dihydroxy acetophenone, vinyl salicylate, etc.

The coloring of the polymer obtained in accordance with the method of the present invention, is less, and the polymer of the present invention has more excellent whiteness, dry strength, dry elongation, and knot strength than the conventional products.

In addition, the polymerization reaction can be effected at a low temperature and therefore the copolymer can be produced under simple operation conditions.

The following are the examples to further illustrate the present invention.

The transparency of the polymer solution in the following examples can be represented by $T_R$ 400 (the transparency of 400 m$\mu$ light), CI (the sum of optical density at 420, 550 and 650 m$\mu$ $\times$100/3), and was measured by a quartz cell whose liquid thickness was 10 mm. by using the spectrophotometer Model QV-50 produced by Shimazu Manufacturing Co., Ltd.

Therefore, the coloring of the original polymer solution is less when the value of $T_R$ 400 is larger and CI is less.

The measurement of the specific reduced viscosity was carried out at 25° C. in such a manner that 60 mg. of dry polymer was dissolved in 20 ml. of dimethylformamide prepared by dissolving 0.10 mol/litre of sodium thiocyanate, and a Nakano viscosimeter (improved model) was used.

Example 1

A 15 ml. hard glass ampoule was charged with 7.3 ml. of dimethylsulfoxide, 1.8 ml. of acrylonitrile, 0.9 ml. of vinylidene chloride and 0.1 ml. of 30% aqueous hydrogen peroxide, and the ampoule was degassed by a vacuum pump. Thereafter the irradiation was carried out at a room temperature (25° C.) by using a 200 w. high pressure mercury arc lamp for 19 hours.

On the other hand, for the sake of comparison, thermal polymerization was carried out by using 20 mg. of azobisisobutyronitrile as the initiators at 45° C. for 36 hours by keeping the concentration of monomer the same as before, and the results are shown in Table 1.

TABLE 1

| | 400 mμ transparency of the polymeric solution (1 cm.) (percent) | Degree of polymerization (percent) | Specific reduced viscosity of polymer (dl./g.) |
|---|---|---|---|
| Photopolymerization | 77.3 | 68.7 | 0.57 |
| Thermal polymerization | 41.4 | 60.7 | 2.14 |

Example 2

The same photopolymerization as in Example 1 was carried out by using various kinds of solvents, and the results are given in Table 2.

TABLE 2

| Solvent | Transparency of the polymeric solution (400 mμ) (percent) | Degree of polymerization (percent) | Specific reduced viscosity (dl./g.) |
|---|---|---|---|
| Dimethylsulfoxide | 77.3 | 68.7 | 0.57 |
| N,N-dimethylformamide | 84.5 | 41.3 | 0.67 |
| N,N-dimethylacetamide | 82.1 | 39.1 | 0.59 |
| Ethylenecarbonate | 89.8 | 56.5 | 0.32 |
| γ-Butyrolactone | 94.6 | 36.2 | 0.53 |

Example 3

A 3.5 litre Pyrex cylindrical reaction vessel was provided internally with a high pressure mercury arc lamp with the short wave light below 320 mμ filtered by means of an ordinary glass cooler in the central portion of said reaction vessel, and the temperature of the reaction vessel was controlled by circulating water on the outer wall of the reaction vessel, and a spiral stirrer was provided inside thereof, to carry out the stirring operation uniformly, and the temperature was kept at about 25° C.

0.1 mol of sodium allylsulfonate and 0.6 mol of methylacrylate, 3.7 mol of vinylidene chloride (containing 50 p.p.m. of methoxyhydroquinone) and 11.4 mol of acrylonitrile were added as monomers to 2.38 litres of dimethylsulfoxide, and 39.7 g. of 30% by weight of the aqueous solution of hydrogen peroxide was added thereto as an initiator to prepare the polymeric solution, and the polymeric solution thus obtained was charged into the above mentioned reaction vessel, and polymerization was carried out by projecting light for 18 hours by using a 100 w. high pressure mercury arc lamp. 71.9% of the monomer was polymerized, and the specific reduced viscosity of the obtained polymer was 1.50.

The permeability of 400 mμ light of the polymeric solution was 77.7% and the C.I. was 1.93.

For the sake of comparison, the thermal polymerization of the polymeric solution was carried out by adding 15.5 g. of azobisbutyronitrile in place of 30% hydrogen peroxide aqueous solution as the initiator at 45° C. for 6 hours, and thereafter the thermal polymerization was carried out for 6 hours at 45° C., at 50° C. for 6 hours, and at 57° C. for 6 hours, i.e., the thermal polymerization was carried out for a total reaction time for 18 hours, and 72.5% of monomer was polymerized, and the specific reduced viscosity of the obtained polymer was 1.45.

On the other hand, the light permeability of the 400 mμ light was 26.9% and the C.I. was 9.36.

From the above given facts, the polymeric solution obtained through photopolymerization had excellent whiteness at almost the same degree of polymerization and specific reduced viscosity.

The two polymeric solutions obtained were extruded through a spinning nozzle having 1000 apertures whose diameter was 0.08 mm. into a 60% dimethylsulfoxide aqueous solution at 30° C., and after coagulation, the filaments obtained were subjected to a water washing process, a drying process and a drawing process, and 3 denier filaments were obtained.

The physical properties of the filament were studied, and the rate of reflection of the filaments obtained by using a colorimeter produced by Shimazu Mfg., Co., Ltd. As a result, it was found out that the filament obtained in accordance with the photopolymerization method had excellent properties in all respects. Some of these are listed in Table 3.

TABLE 3

| | Method of polymerization | |
|---|---|---|
| Physical properties | Photopolymerization | Thermal polymerization |
| Dry strength, g./d | 3.42 | 2.85 |
| Dry elongation, percent | 28.4 | 25.6 |
| Knot strength, g./d | 2.13 | 1.99 |
| 400 mμ reflection rate, percent | 81.5 | 60.2 |

Example 4

A polymeric solution of dimethylsulfoxide, composed of 72.3 mol percent of acrylonitrile, 23.0% of vinylidene chloride, 4.0% of methylacrylate, 0.7 mol percent of sodium acrylsulfonate wherein the monomer concentration was 4.50 mol/litre, was mixed along with 0.10 mol/litre of hydrogen peroxide as the initiator, and various color-preventing agents were added thereto.

The resulting polymeric solution was transferred into a Pyrex glass ampoule whose diameter was 25 mm., the air inside the ampoule was replaced with nitrogen, and photopolymerization was carried out at a temperature from 25 to 30° C. for 24 hours after having sealed up the ampoule by placing said ampoule 100 mm. away from the center of a 100 w. high pressure mercury lamp.

The properties of the polymer solution obtained are shown in Table 4.

TABLE 4

| Color preventing agents | Whiteness of polymeric solution | | Degree of polymerization (percent) | Specific viscosity (dl./g.) |
|---|---|---|---|---|
| | CI | T$_R$400 (percent) | | |
| Salycylic acid | 4.43 | 69.5 | 79.8 | 1.47 |
| Methyl salicylate | 4.56 | 67.2 | 78.8 | 1.44 |
| Salicyclic acid anilide | 4.21 | 68.0 | 79.2 | 1.50 |
| Salicylic acid amide | 4.08 | 67.5 | 78.0 | 1.52 |
| Sulfosalicylic acid | 5.92 | 59.5 | 80.1 | 1.39 |
| 2,3-cresotic acid | 3.96 | 70.1 | 77.5 | 1.41 |
| 2,4-cresotic acid | 4.05 | 68.9 | 79.0 | 1.48 |
| 2,5-cresotic acid | 4.17 | 68.4 | 79.0 | 1.48 |
| 5,5'-methylene bis-salicylic acid | 3.75 | 72.0 | 77.2 | 1.52 |
| 2,4-dihydroxyacetophenone | 4.25 | 69.2 | 80.0 | 1.51 |
| Phenol [1] | 9.50 | 40.3 | 86.0 | 1.12 |

[1] This was used as a control.

Example 5

A monomer structure composed of 72.3 mol percent of acrylonitrile, 23.0% of vinylidene chloride, 4.0 mol percent of methylacrylate, 0.7 mol percent of sodium allylsulfonate, was dissolved in N,N-dimethylformamide, N,N-dimethylacetamide, dimethylsulfoxide and γ-butyrolactone in such a manner that the monomer concentration was 4.50 mols/litre.

In this case 0.10 mol/litre of hydrogen peroxide was used as the initiator, and photopolymerization was carried out for 8 hours under the same conditions as in Example 4.

The properties of the resulting polymer solution are given in Table 5.

TABLE 5

| Solvent | Amount of salicylic acid (mol percent) | Whiteness of polymeric solution | | Degree of polymerization (percent) | Specific reduced viscosity (dl./g.) |
|---|---|---|---|---|---|
| | | CI | T$_R$400 (percent) | | |
| Dimethylsulfoxide | 0.010 | 1.23 | 92.2 | 48.1 | 1.97 |
| N,N-dimethylformamide | 0.010 | 2.95 | 75.0 | 43.1 | 0.70 |
| γ-Butyrolactone | 0.010 | 1.05 | 91.5 | 38.4 | 0.91 |
| N,N-dimethylacetamide | 0.010 | 3.01 | 85.5 | 45.1 | 0.74 |

Example 6

957 parts of acrylonitrile, 613 parts of vinylidene chloride, 65 parts of methylacrylate and 26 parts of sodium allylsulfonate were dissolved in 4037 parts of dimethylsulfoxide, and 62.3 parts of 30% hydrogen peroxide aqueous solution were added as the initiator, and 11 parts of soft water were added thereto. The whole mixture was charged into a 6 litre cylindrical vessel, and a 100 w. high pressure mercury arc lamp was dipped in. Photopolymerization was carried out while stirring the whole mixture in accordance with the internal irradiation system in a nitrogen atmosphere.

The properties of the resulting polymeric solution are given in Table 6.

TABLE 6

| Anti-coloration agents | Amount, mol/l. | Polymerization temperature (° C.) | Polymerization time (hr.) |
|---|---|---|---|
| Salicylic acid | 0.003 | 25 | 22 |
| 2,3-cresotinic acid | 0.003 | 35 | 18 |
| Methyl salicylate | 0.003 | 25 | 18 |
| Salicylic acid anilide | 0.003 | 25 | 18 |

| Anti-coloration agents | Whiteness of polymeric solution | | Degree of polymerization (percent) | Specific reduced viscosity (dl./g.) |
|---|---|---|---|---|
| | CI | T$_R$400 (percent) | | |
| Salicylic acid | 1.33 | 84.6 | 73.0 | 1.62 |
| 2,3-cresotinic acid | 2.73 | 76.7 | 71.8 | 1.46 |
| Methyl salicylate | 1.25 | 86.0 | 72.0 | 1.50 |
| Salicylic acid anilide | 1.09 | 87.8 | 71.5 | 1.56 |

The following is claimed:

1. The method for photocopolymerizing acrylonitrile and vinylidene chloride comprising projecting light of a wave length of from about 300 mμ to about 400 mμ in a mixture comprised of said acrylonitrile and vinylidene chloride in a molar ratio of from about 17:3 to 13:7, respectively, in dimethylsulfoxide in the presence of 0.002–0.8 mol/liter of the mixture of hydrogen peroxide.

2. Method according to claim 1 wherein there is added to the mixture from about $10^{-5}$ to about 1 mol/litre of a color preventing agent selected from the group consisting of salicyclic acid and derivatives thereof, the quantity being based on the amount of the reaction mixture.

References Cited

UNITED STATES PATENTS 3,424,731  1/1969  Blood et al. _____ 260—85.5 X
3,532,675  10/1970  Rivlin _____ 260—85.5 X

OTHER REFERENCES

Kosar, Light Sensitive Systems, Wiley & Sons, p. 170.

JOHN C. BLEUTGE, Primary Examiner

U.S. Cl. X.R.

204—159.24; 260—30.4 N, 30.8 DS, 32.6 N, 80.6, 80.81, 85.5 XA